United States Patent
Michalek et al.

(10) Patent No.: US 12,106,665 B2
(45) Date of Patent: Oct. 1, 2024

(54) FIRST RESPONDER TRANSIT ALERT SYSTEM AND METHOD

(71) Applicants: Gregory R. Michalek, Cumming, GA (US); Gregory S. Michalek, Canton, GA (US)

(72) Inventors: Gregory R. Michalek, Cumming, GA (US); Gregory S. Michalek, Canton, GA (US)

(*) Notice: Subject to any disclaimer, the term of this patent is extended or adjusted under 35 U.S.C. 154(b) by 61 days.

(21) Appl. No.: 17/981,726

(22) Filed: Nov. 7, 2022

(65) Prior Publication Data

US 2023/0267833 A1    Aug. 24, 2023

Related U.S. Application Data

(60) Provisional application No. 63/313,515, filed on Feb. 24, 2022.

(51) Int. Cl.
| | |
|---|---|
| *G08G 1/0965* | (2006.01) |
| *G08G 1/052* | (2006.01) |
| *G08G 1/056* | (2006.01) |
| *H04W 4/02* | (2018.01) |
| *H04W 4/90* | (2018.01) |
| *H04W 76/50* | (2018.01) |
| *H04W 88/12* | (2009.01) |

(52) U.S. Cl.
CPC ........... *G08G 1/0965* (2013.01); *G08G 1/052* (2013.01); *G08G 1/056* (2013.01); *H04W 4/023* (2013.01); *H04W 4/027* (2013.01); *H04W 4/90* (2018.02); *H04W 76/50* (2018.02); *H04W 88/12* (2013.01)

(58) Field of Classification Search
CPC ...... G08G 1/0965; G08G 1/052; G08G 1/056; H04W 4/90; H04W 76/50; H04W 4/023; H04W 4/027; H04W 88/12
USPC .......................................................... 340/903
See application file for complete search history.

(56) References Cited

U.S. PATENT DOCUMENTS

| | | | |
|---|---|---|---|
| 7,629,899 B2 * | 12/2009 | Breed ................... | G08G 1/165 |
| | | | 340/995.13 |
| 9,841,767 B1 * | 12/2017 | Hayward ............... | G05D 1/229 |
| 10,424,196 B1 * | 9/2019 | McEnroe ............... | G08G 1/087 |

(Continued)

OTHER PUBLICATIONS

"Preventing First Responder Collisions with Digital Alerting", by Haas Alert, Dec. 14, 2020.

*Primary Examiner* — Kerri L McNally
*Assistant Examiner* — Thang D Tran
(74) *Attorney, Agent, or Firm* — Daniel J. Santos

(57) ABSTRACT

A first responder transit alert system and method cause notifications to be sent to wireless personal computing devices (PCDs) in vehicles traveling in the forward path of the first responder vehicle traveling to an emergency site. A processor of the system performs a process comprising: determining whether a wireless alert signal has been broadcast by a wireless device of the first responder vehicle; if so, receiving and processing geographical coordinates of multiple positions of PCDs traveling in vehicles in one or more lanes of a highway system and geographical coordinates of multiple positions of the wireless device of the first responder vehicle to determine velocities of the PCDs and of the wireless device; processing the positions and velocities to determine a subset of the PCDs to which to send a wireless alert notification; and causing the wireless alert notification to be sent to the PCDs of the subset.

19 Claims, 8 Drawing Sheets

(56) References Cited

U.S. PATENT DOCUMENTS

| | | | | |
|---|---|---|---|---|
| 10,909,778 B1* | 2/2021 | Chan | | G07C 5/008 |
| 11,651,683 B1* | 5/2023 | Presna | | G08G 1/096816 |
| | | | | 340/906 |
| 2002/0069312 A1* | 6/2002 | Jones | | G06Q 30/02 |
| | | | | 711/100 |
| 2007/0021915 A1* | 1/2007 | Breed | | B60W 30/18159 |
| | | | | 701/301 |
| 2007/0159354 A1* | 7/2007 | Rosenberg | | G08G 1/0965 |
| | | | | 340/902 |
| 2013/0279392 A1* | 10/2013 | Rubin | | H04W 4/12 |
| | | | | 370/312 |
| 2013/0279491 A1* | 10/2013 | Rubin | | G08G 1/162 |
| | | | | 370/347 |
| 2016/0090055 A1* | 3/2016 | Breed | | B60N 2/067 |
| | | | | 701/2 |
| 2017/0276495 A1* | 9/2017 | Krishnan | | G08G 1/096741 |
| 2017/0330457 A1* | 11/2017 | Bhalla | | G08G 1/093 |
| 2018/0087914 A1* | 3/2018 | Bravo | | G08G 1/0965 |
| 2018/0096587 A1* | 4/2018 | Erman | | H04W 4/90 |
| 2018/0132285 A1* | 5/2018 | Jackson | | G08B 25/10 |
| 2018/0334161 A1* | 11/2018 | Mizuno | | B60W 10/04 |
| 2019/0051151 A1* | 2/2019 | Mueck | | G08G 1/005 |
| 2019/0120644 A1* | 4/2019 | Alcazar | | G01C 21/3492 |
| 2019/0197888 A1* | 6/2019 | Difrancesco | | G08G 1/08 |
| 2020/0020212 A1* | 1/2020 | Song | | B60Q 1/507 |
| 2020/0043342 A1* | 2/2020 | Cunningham | ... | G08G 1/096791 |
| 2020/0207367 A1* | 7/2020 | Adireddy | | G08G 1/163 |
| 2020/0221250 A1* | 7/2020 | Whelen | | H04W 4/46 |
| 2020/0280829 A1* | 9/2020 | Benefield | | H04W 4/46 |
| 2021/0112368 A1* | 4/2021 | Whelen | | G08G 1/096775 |
| 2021/0184989 A1* | 6/2021 | Wu | | G06F 18/24 |
| 2021/0204148 A1* | 7/2021 | Chou | | H04W 24/02 |
| 2021/0227362 A1* | 7/2021 | Wu | | G08G 1/164 |
| 2021/0227468 A1* | 7/2021 | Wu | | H04W 4/40 |
| 2022/0012645 A1* | 1/2022 | Ying | | G06N 20/20 |
| 2022/0116725 A1* | 4/2022 | Larsen | | H04R 5/04 |
| 2022/0124560 A1* | 4/2022 | Yeh | | H04L 41/5025 |
| 2023/0251344 A1* | 8/2023 | Luo | | H04W 4/90 |
| | | | | 455/456.1 |

* cited by examiner

FIRST RESPONDER TRANSIT ALERT SYSTEM AND METHOD

CROSS-REFERENCE TO RELATED APPLICATIONS

The present application is a nonprovisional application that claims priority to, and the benefit of the filing date of, U.S. provisional application Ser. No. 63/313,515, filed on Feb. 24, 2022, entitled "FIRST RESPONDER TRANSIT ALERT SYSTEM AND METHOD", which is incorporated by reference herein.

TECHNICAL FIELD

The present disclosure is directed, in general, to first responder transit alert systems and methods, and more particularly, to first responder transit alert systems and methods that transmit alerts to portable computing devices (PCDs), such as mobile phones, for example, of drivers who are in the path of a first responder vehicle that is in transit to the scene of an emergency.

BACKGROUND

Car accidents, fires, illness, injuries, criminal activity and the like often require an immediate response from first responders. In most cases, the first responders must travel from a central location such as a fire house or police precinct to the location where they are needed. While sirens, lights and/or horns are employed as alert indicators to alert drivers that the first responders are traveling to a location where they are needed, oftentimes the siren, lights and/or horn are the first indications to a driver who is in the path of the first responder vehicle to clear the path.

In some cases, traffic or other conditions make it difficult for the driver to clear the path given the relatively short warning provided by the lights, siren and/or horn of the approaching first responder vehicle. Drivers in the path of the first responder vehicle may not notice these alert indicators until the first responder vehicle is in close proximity to the driver's vehicle, which can result in the driver having insufficient time to change lanes or take other action to clear the path.

In addition, the lights, siren and/or horn often do not convey sufficient information to the driver for them to know where the first responder vehicle is, in which direction it is traveling, in which lane it is traveling, or other details that allow the driver to determine the best course of action to take to clear the path and then take that action.

Additionally, the driver may be listening to loud music, talking on their phone, conversing with passengers or performing other acts that prevent the driver from noticing the alert indicators of the first responder vehicle until the first responder vehicle is in very close proximity to the driver's vehicle. At that point in time, it may be too late to maneuver out of the way of the first responder vehicle without creating a dangerous situation.

All of the aforementioned problems with the current alert systems and methods create impediments to the first responder vehicle arriving at the emergency scene as quickly as possible. Because response time is critical in first responder emergencies, anything that creates an impediment to the first responder arriving at the emergency scene as quickly as possible can result in loss of life and harm to individuals and property.

A need exists for a first responder alert system and method that better alerts drivers in the path of the first responder vehicle that the path needs to be cleared while providing the drivers with more time to safely and quickly clear the path.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
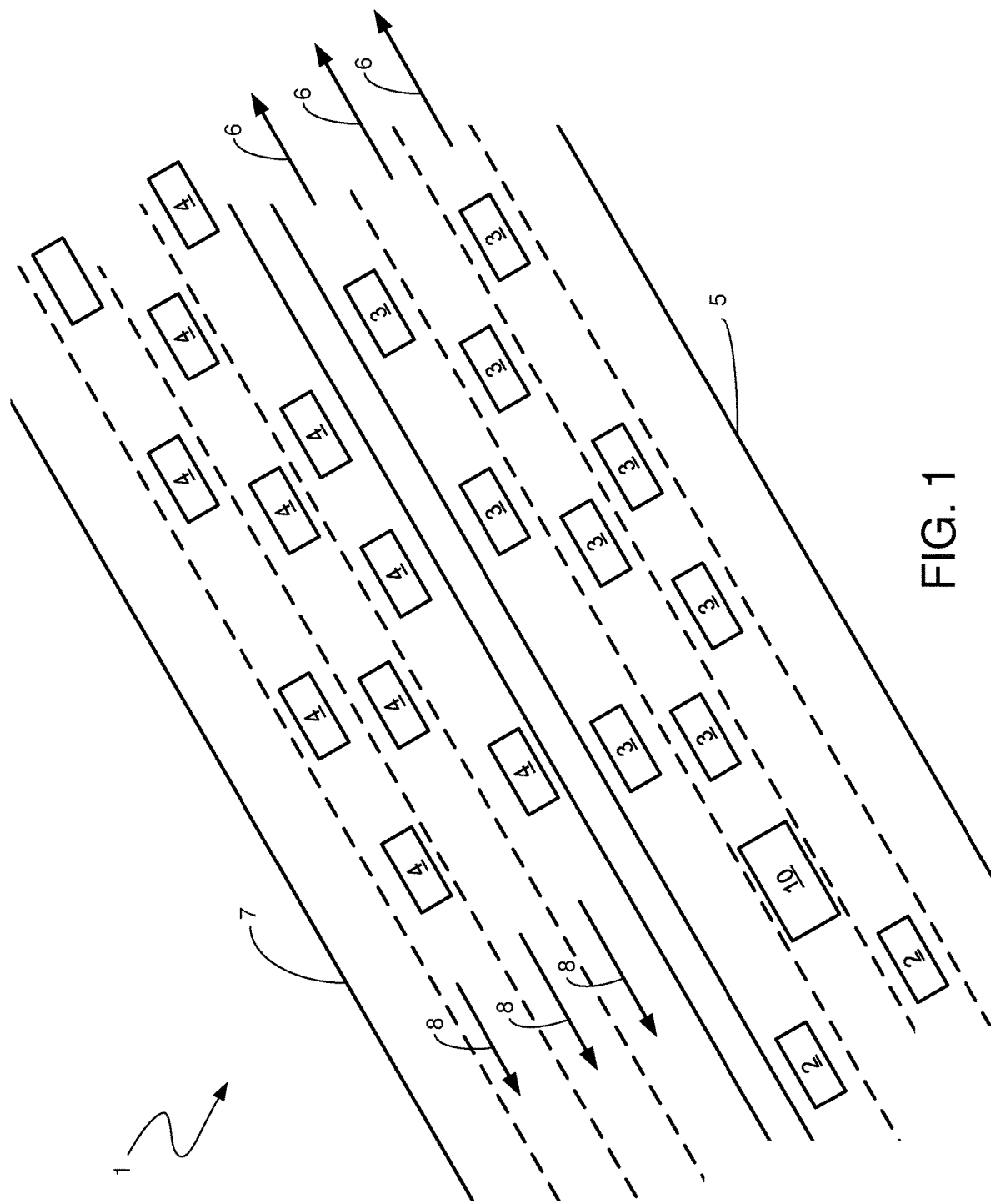
FIG. 1 is a top illustrative view of a highway or freeway system having multiple lanes for traffic moving in a first direction and multiple lanes for traffic moving in a second direction showing a variety of vehicles including a first responder vehicle traveling on the freeway system.

The present disclosure is directed to systems and methods for providing alerts to those in the path of a first responder vehicle to alert drivers to clear the path. In accordance with the systems and methods, notifications are sent to personal computing devices (PCDs), such as smart phones, for example, of drivers whose vehicles are located in the forward path of the first responder vehicle in between the first responder vehicle and the scene of an emergency.

In the following detailed description, for purposes of explanation and not limitation, exemplary, or representative, embodiments disclosing specific details are set forth in order to provide a thorough understanding of the inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only and is not intended to be limiting. Any specifically-defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art.

Relative terms, such as "over," "above," "below," "top," "bottom," "front," "back," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

A computing device may include multiple subsystems, cores or other components. Such a computing device may be, for example, a portable computing device ("PCD"), such as a mobile phone, a tablet portable computer (e.g., an iPad), a laptop computer, a smart wearable device, and Internet of Things (IoT) device, a smartphone, or a portable digital assistant (PDA) having a wireless modem for communicating over a wireless communications network.

FIG. 1 is a top illustrative view of a highway or freeway system 1 having multiple lanes 5 moving in a first direction indicated by arrows 6 and multiple lanes 7 moving in a second direction indicated by arrows 8. The highway or freeway system 1 is an example of a road system that is being used herein only for the purpose of demonstrating the inventive principles and concepts of the present disclosure. The systems and methods in accordance with the inventive principles and concepts of the present disclosure are not limited to any particular type of roadway system.

In FIG. 1, a first responder vehicle 10 is shown moving in a forward, or first, direction 6 in route to the scene of an emergency. A plurality of driver vehicles 3 are also moving in the first direction 6 in the forward path of the first responder vehicle 10 and are located in between the first responder vehicle 10 and the scene of the emergency. A plurality of driver vehicles 2 are also moving in the first direction 6, but are located behind the first responder vehicle 10, and thus are no longer in the forward path of the first responder vehicle 10. A plurality of driver vehicles 4 are traveling on lanes 7 in a second direction 8 that is generally opposite the first direction 6, and thus are not in the forward path of the first responder vehicle 10. For exemplary purposes, it will be assumed that lanes 5 are separated from lanes 7 by a median, and therefore traffic moving in the second direction 8 on lanes 7 is not of concern to the driver or crew of the first responder vehicle 10.

In accordance with a preferred embodiment, an alert notification is sent to the PCDs of the drivers of the driver vehicles 3 moving in the first direction 6 in the forward path of the first responder vehicle 10 in between the first responder vehicle 10 and the scene of the emergency. Preferably the alert notification is sent only to the PCDs of the driver vehicles 3 that are a configurable threshold distance in front of the first responder vehicle 10. The alert notifications are not sent to the PCDs of the driver vehicles 2 located behind the first responder vehicle 10 or to PCDs of drivers of driver vehicles 4 traveling on lanes 7 and moving in the second direction 8, as they are not in the forward path of the first responder vehicle 10.

The system and method for causing the alert notifications to be sent to the relevant PCDs can be configured and implemented in a number of ways. An example embodiment of one suitable configuration and implementation of the system and method for accomplishing these goals will now be described with reference to FIGS. 2-4.

Figure 2:
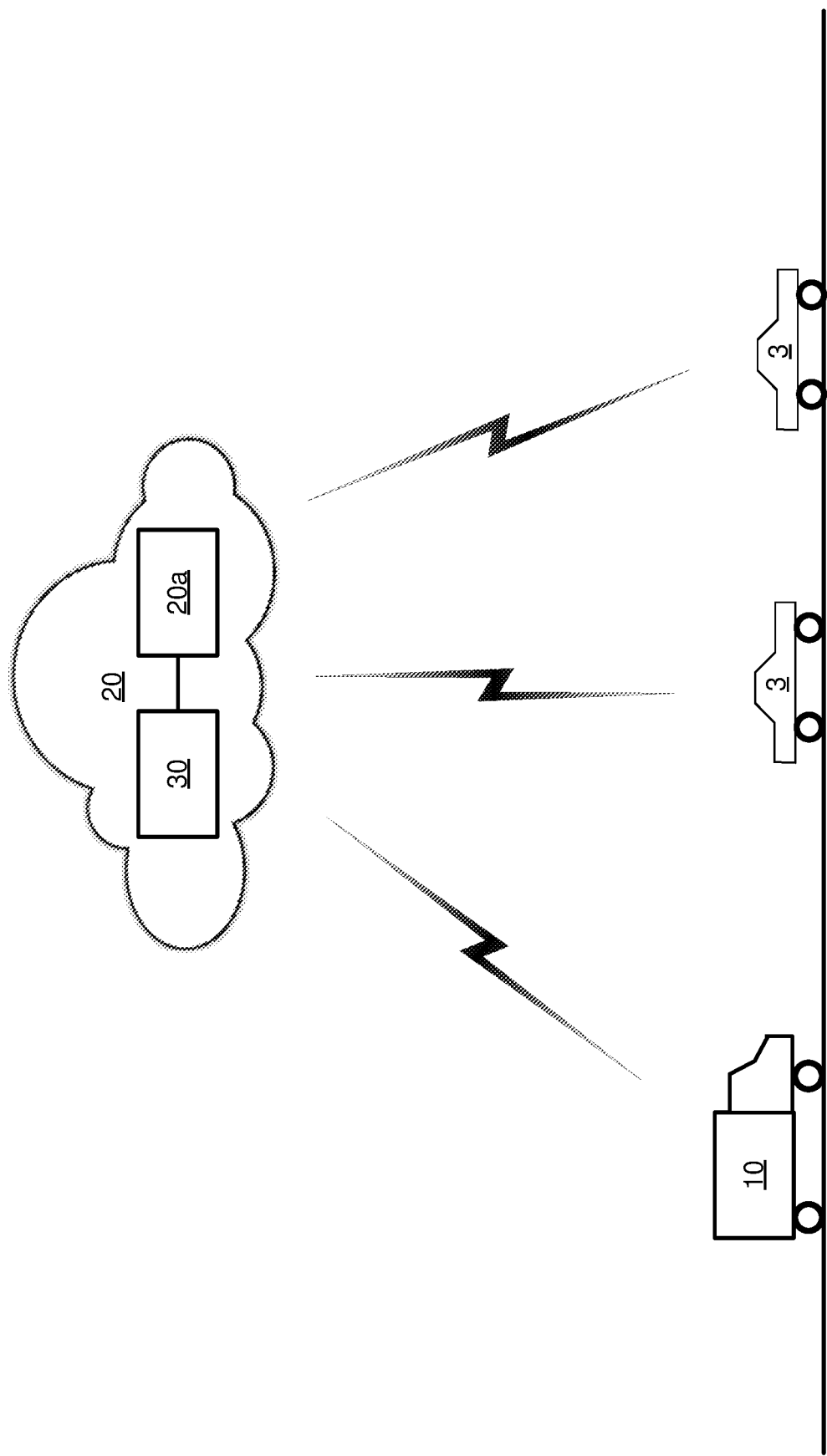
FIG. 2 illustrates a side view of a portion of the highway or freeway system shown in FIG. 1 that shows wireless communications occurring between the first responder vehicle and a wireless communications network and between the wireless communications network and driver vehicles that are in the forward path of the first responder vehicle.

FIG. 2 illustrates a side view of a portion of the highway or freeway system 1 shown in FIG. 1 that shows wireless communications occurring between the first responder vehicle 10 and a wireless communications network 20 and between the wireless communications network 20 and driver vehicles 3 that are in the forward path of the first responder vehicle 10. A wireless transmitter or transceiver of the first responder vehicle 10 communicates with the wireless communications network 20 over a wireless link. First responder vehicles are currently equipped with wireless transceivers that communicate over a wireless network to allow first responders to communicate with dispatchers that also communicate over the wireless network.

In accordance with this representative embodiment, when the first responder vehicle 10 is responding to an emergency, it transmits a wireless alert notification signal to the wireless communication network 20. A first responder transit alert system 30 of the wireless communications network 20 receives the wireless alert notification signal transmitted by the wireless transmitter or transceiver of the first responder vehicle 10 and determines the Global Positioning System (GPS) location and the velocity of the first responder vehicle 10.

As is known in the art, velocity can be calculated from the GPS coordinates of at least two locations of the vehicle 10 and the instants in time at which the vehicle 10 arrived at the two GPS locations. The first responder transit alert system 30 can make these velocity calculations or it can receive some or all of this information from one or more other network elements of the wireless communications network 20. For example, first responder vehicles are often equipped with a computer aided design (CAD) system and with a wireless transceiver that keep track of the GPS coordinates and velocity of the first responder vehicle. The CAD and the wireless transceiver can be considered the PCD of the first responder vehicle 10 for purposes of the discussion provided herein. In cases in which the PCD of the first responder vehicle 10 keeps track of its own GPS coordinates and velocity, this information can be forwarded along with the alert notification signal to the alert system 30 so that the alert system 30 does not have to perform these calculations.

There are other ways, however, to obtain the velocity of the PCD of the first responder vehicle 10. As discussed in more detail below, it is known that network equipment of wireless networks typically tracks the GPS coordinates of all of the PCDs communicating with the network. This determination is typically based on the strength of wireless signals broadcast by the PCDs. Such network equipment, which is represented by block 20a in FIG. 2, typically computes the GPS coordinates of every PCD communicating with the respective cell tower periodically, such as at 5 second (s) intervals, for example.

In accordance with an embodiment, the alert system 30 is configured to receive from the network equipment 20a the GPS coordinates of all of the PCDs communicating with each respective cell tower at, for example, 5 s, 10 s and 15 s intervals and calculate the velocity, i.e., the forward path, of the PCD traveling in the first responder vehicle 10. Preferably, each wireless provider's network in which the inventive principles and concepts are implemented comprises at least one instance of the alert system 30. The alert system 30 receives the alert notification signal from the PCD of the first responder vehicle 10 and the GPS coordinates of the PCD of the first responder vehicle 10 and computes the velocity, i.e., the forward path, of the first responder vehicle 10 based on multiple sets of the GPS coordinates received by system 30 at different instants in time (e.g., once every 5 s).

The alert system 30 also receives the GPS coordinates of the PCDs of vehicles 2, 3 and 4 from an instance of the network equipment 20a, which may or may not be the same as the instance of network equipment 20a that sends alert system 30 the GPS coordinates of the PCD traveling in the first responder vehicle 10. As indicated above, each network provider preferably employs at least one instance of the alert system 30 in its wireless network, so regardless of which of these wireless providers' networks the PCDs are in communication with, the respective alert system 30 will receive the coordinates of the PCDs traveling in vehicles 2, 3, 4 and 10. The alert system 30 processes GPS coordinates received periodically from the network equipment 20a and calculates the velocities of the PCDs traveling in vehicles 2, 3, 4 and 10. Based on the GPS coordinates of the PCDs traveling in vehicles 2, 3, 4 and 10 and their velocities, the alert system 30 determines which of the PCDs are traveling in vehicles that are in the forward path of the first responder vehicle 10 a configurable threshold distance in front of the first responder vehicle 10. In FIGS. 1 and 2, these are the PCDs traveling in vehicles 3. The alert system then causes the alert notification to be sent only to those PCDs.

The term "configurable threshold distance," as that term is used herein, means a value for the distance that is selected when the system 30 is manufactured and configured by, for example, an original equipment manufacturer (OEM), or a value that is input by the user of the system during or after installation of the system 30 in the wireless network.

Figure 3:
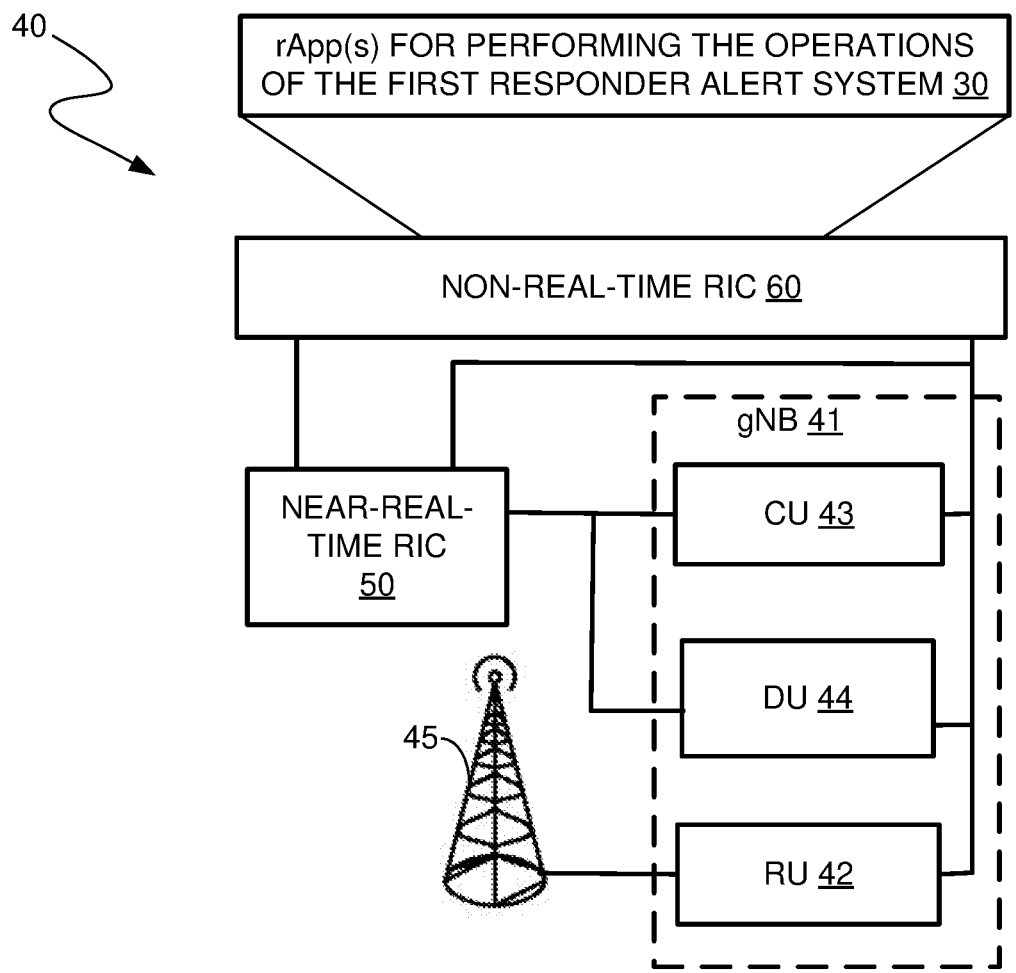
FIG. 3 is a block diagram of a portion of network shown in FIG. 2 in accordance with a representative embodiment in which the inventive principles and concepts are implemented in a Radio Network such as, for example, an Open Radio Access Network (O-RAN) network.

FIG. 3 is a block diagram of a portion 40 of network 20 in accordance with a representative embodiment in which the inventive principles and concepts are implemented in a Radio Network, such as, for example, an Open Radio Access Network (O-RAN) network. To take advantage of the benefits of 5G, LTE and later generations of wireless network architectures, efforts have been made in the wireless communications industry to decentralize and disaggregate wireless network equipment and functionality. Those efforts in standardization and research have led to an evolution from Radio Access Network (RAN) network architectures to O-RAN network architectures. Traditional RAN network architectures employ black-box, or all-in-one, solutions for the entire cellular protocol stack. Such solutions are offered by a limited number of vendors, have limited reconfigurability and are relatively inflexible in terms of allowing wireless network operators to interface with RAN equipment of different vendors. The O-RAN standards and architectures promote disaggregation of components and virtualization, allowing for greater flexibility in choosing vendors and more virtualization of functions, leading to greater reconfigurability.

The inventive principles and concepts of the present disclosure can be implemented using an O-RAN network architecture defined by the Third Generation Partnership Project (3GPP) standards, as will now be described with reference to FIG. 3. FIG. 3 is a block diagram of an O-RAN system configured in accordance with a representative embodiment to implement the first responder transit alert system and method of the present disclosure. A NR Next Generation Node Base (gNB) 41 of the O-RAN system allows 5G user equipment (UE) such as a PCD to connect with a 5G NR core using a 5G NR air interface. The gNB 41 comprises a Radio Unit (RU) 42, a Central Unit (CU) 43 and a Distributed Unit (DU) 44. The CU 43 comprises a Control Plane (CP) and a User Plane (UP). The RU 42 is electrically coupled to the cell site tower 45 and performs the cellular physical low layer protocol stack functionalities of the cell site, such as, for example, precoding, Fast Fourier Transform (FFT) and Cyclic Prefix addition/removal, beamforming and radio frequency (RF) processing. The DU 44 performs cellular physical high layer protocol stack functionalities such as, for example, scrambling, modulation, layer mapping, precoding, and mapping into physical resource blocks. The CU 43 performs the processing of the higher layers of the cellular protocol stack.

The O-RAN system also comprises a near-real-time (near-RT) RAN Intelligent Controller (RIC) 50 and a non-real-time (non-RT) RIC 60 that are programmable components that allow for closed-loop control and orchestration of the O-RAN functions using machine learning (ML) and artificial intelligence (AI) algorithms. The two RICs 50 and 60 cooperate to process Key Performance Measurements (KPMs) relating to the network infrastructure such as, for example, load, number of users, resource utilization, etc., to perform network optimization in terms of load balancing, handovers, RAN slicing, scheduling policies, etc. The algorithms performed by the non-RT RIC 60 operate on a time scale longer than 1 s to perform network orchestration tasks whereas the control loop algorithms of the near-RT RIC 50 operate on a time scale between 10 milliseconds (ms) and 1 s.

The O-RAN system shown in FIG. 3 is part of what is commonly referred to as an O-Cloud. The O-Cloud is a combination of computing resources and virtualization infrastructure that are pooled together in one or more data centers and comprises a combination of physical nodes, software and/or firmware components, application program interfaces (APIs), and hardware components (e.g., processors, severs, computers, etc.). The RU 42 is typically located at the cell tower site. The CU 43 and the DU 44 are typically located in the edge of the O-Cloud, commonly referred to as the Edge Cloud. The RICs 50 and 60 are typically located in the Regional Cloud of the O-Cloud.

The non-RT RIC 60 is a component of the Service Management and Orchestration (SMO) framework of the O-RAN system and performs operations in a non-RT control loop that complement the near-RT control loop operations performed by the near-RT RIC 50. The near-RT RIC 50 comprises one or more processors or processing cores that are programmed to execute multiple application programs, including xApps, which are microservices that perform radio resource management functions, as well as other programs that help manage execution of the xApps.

The non-RT RIC 60 is programmed to execute rApps, which are third-party application programs used to provide value-added services. In accordance with a representative embodiment, the operations of the first responder alert system 30 shown in FIG. 2 are implemented in one or more rApps executed by the non-RT RIC 60. The non-RT RIC 60 executing the rApp(s) receives the wireless alert notification signal broadcast by the PCD of the first responder vehicle 10. The non-RT RIC 60 also receives the GPS coordinates of the PCDs 2-4 and 10 at multiple time instants. As indicated above, it is known that network equipment 20a periodically (e.g., once very 5 s) computes the GPS coordinates of PCDs that are in communication with the wireless network. The network equipment 20a can be part of any of the components 42-60 shown in FIG. 3 or some other network equipment that is external to, but in communication with, the O-RAN system shown in FIG. 3. It should be noted, however, that the inventive principles and concepts are not limited with respect to the type of network equipment or location of the network equipment that computes the GPS coordinates and forwards them to the non-RT RIC 60.

The rApp(s) of the present disclosure being executed by the non-RT RIC 60 receives the GPS coordinates of the PCDs 2-4 and 10 at multiple time instants. From this information, the rApp(s) calculates the velocities of the PCDs 2-4 and 10, identifies the PCDs that are traveling in the vehicles 3 that are in the forward path of the first responder vehicle 10 a configurable threshold distance from the first responder vehicle 10, and causes an alert notification to be sent to the PCDs traveling in the vehicles 3.

While the method of the present disclosure preferably is performed in the non-RT RIC 60, it should be noted that the method of the present disclosure can be performed at any suitable location in the network by any suitable processor, controller or computer. For example, the CAD system mentioned above that is typically employed in first responder vehicles can be configured to perform the method, i.e., to receive the GPS coordinates of the PCDs traveling in vehicles 2-4, calculate the velocities of the PCDs traveling in vehicles 2-4, identify the PCDs that are traveling in the vehicles 3 that are in the forward path of the first responder vehicle 10 a configurable threshold distance from the first responder vehicle 10, and cause an alert notification to be sent by the wireless network to the PCDs traveling in those vehicles 3.

Figure 4:
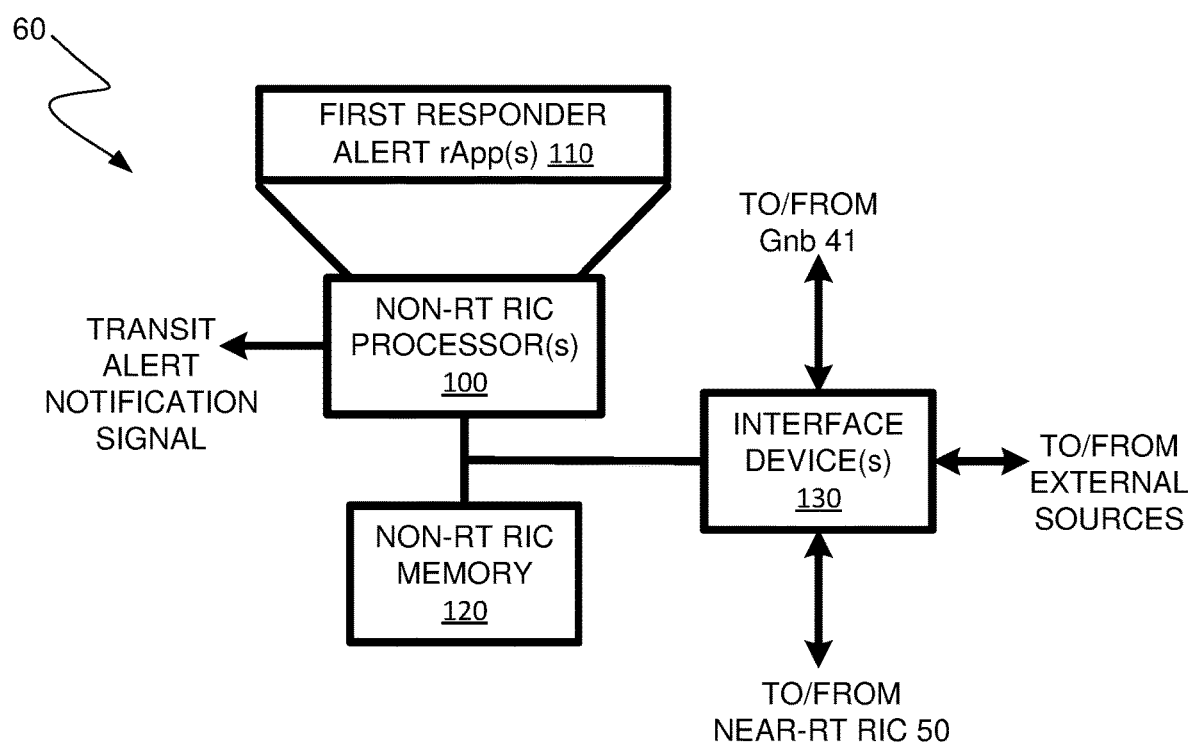
FIG. 4 is a block diagram of the non-real-time (non-RT) RIC of the Radio Network shown in FIG. 3 configured to implement the system and method of the present disclosure in accordance with a representative embodiment.

FIG. 4 is a block diagram of the non-RT RIC 60 shown in FIG. 3 configured to implement the system and method of the present disclosure in accordance with a representative embodiment. In other words, in accordance with this representative embodiment, the non-RT RIC 60 is acting as the system 30. The non-RT RIC 60 can have a variety of hardware, software and/or firmware configurations. The configuration shown in FIG. 4 is one of many possible configurations for implementing the system and method of the present disclosure. The non-RT RIC 60 comprises one or more processors 100 configured to execute the first responder alert rApp(s) 110 of the present disclosure, a memory device or database 120, and one or more interface devices 130 for interfacing the non-RT RIC 60 with the near-RT RIC 50, with the gNB 41 and with sources external to the O-Cloud.

The computer code comprising the first responder alert rApp(s) 110 of the present disclosure can be stored in the non-RT RIC memory 120. The rApp(s) 110 can be configured to detect when a wireless first alert signal has been broadcast by the PCD of the first responder vehicle 10. Alternatively, some other network element can be configured to detect when a wireless first alert signal has been broadcast by the PCD of the first responder vehicle 10 and can then notify the rApp(s) 110 that the wireless first alert signal has been detected by the PCD of the first responder vehicle 10.

Upon the wireless alert signal being detected, the first alert rApp(s) 110 receives the GPS coordinates of the PCDs 2-4 and 10 at multiple time instants and processes this information to (1) calculate the velocities of the PCDs 2-4 and 10, (2) identify the PCDs that are traveling in the vehicles 3 that are in the forward path of the first responder vehicle 10 a configurable threshold distance from the first responder vehicle 10, and (3) cause a wireless first alert transit notification to be sent to the PCDs of the vehicles 3.

Figure 5:
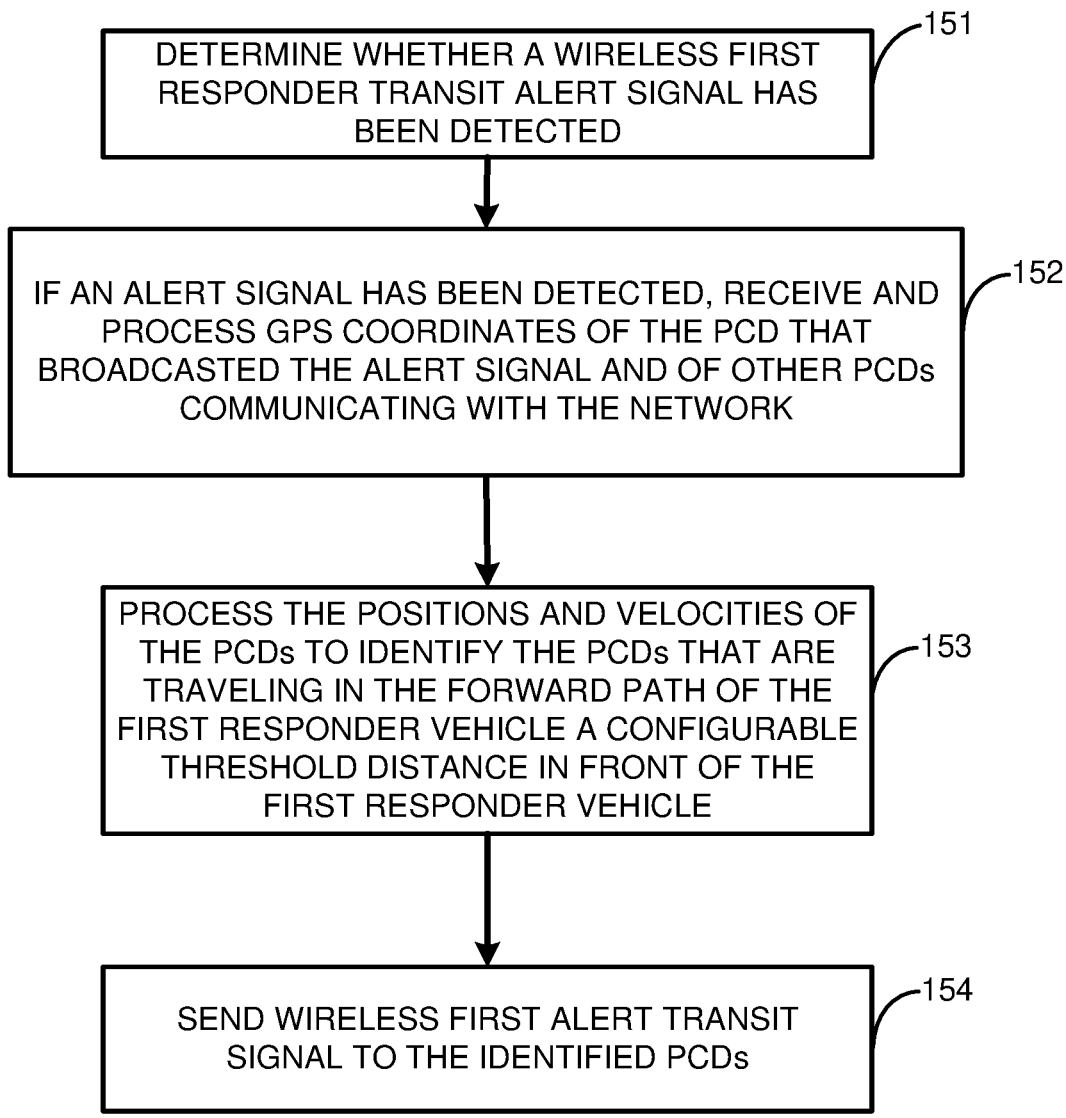
FIG. 5 is a flow diagram of the first alert transit alert method of the present disclosure performed by the system of the present disclosure in accordance with a representative embodiment.

FIG. 5 is a flow diagram of the first alert transit method of the present disclosure performed by the system of the present disclosure in accordance with a representative embodiment. In the step represented by block 151, a determination is made of whether a wireless first responder transit alert signal has been detected. After, or substantially simultaneously with, determining whether the wireless first responder transit alert signal has been detected, GPS coordinates of the PCDs 2-4 and 10 at multiple time instants are received and processed to calculate the velocities of the PCDs 2-4 and 10, as indicated by block 152.

Figure 6:
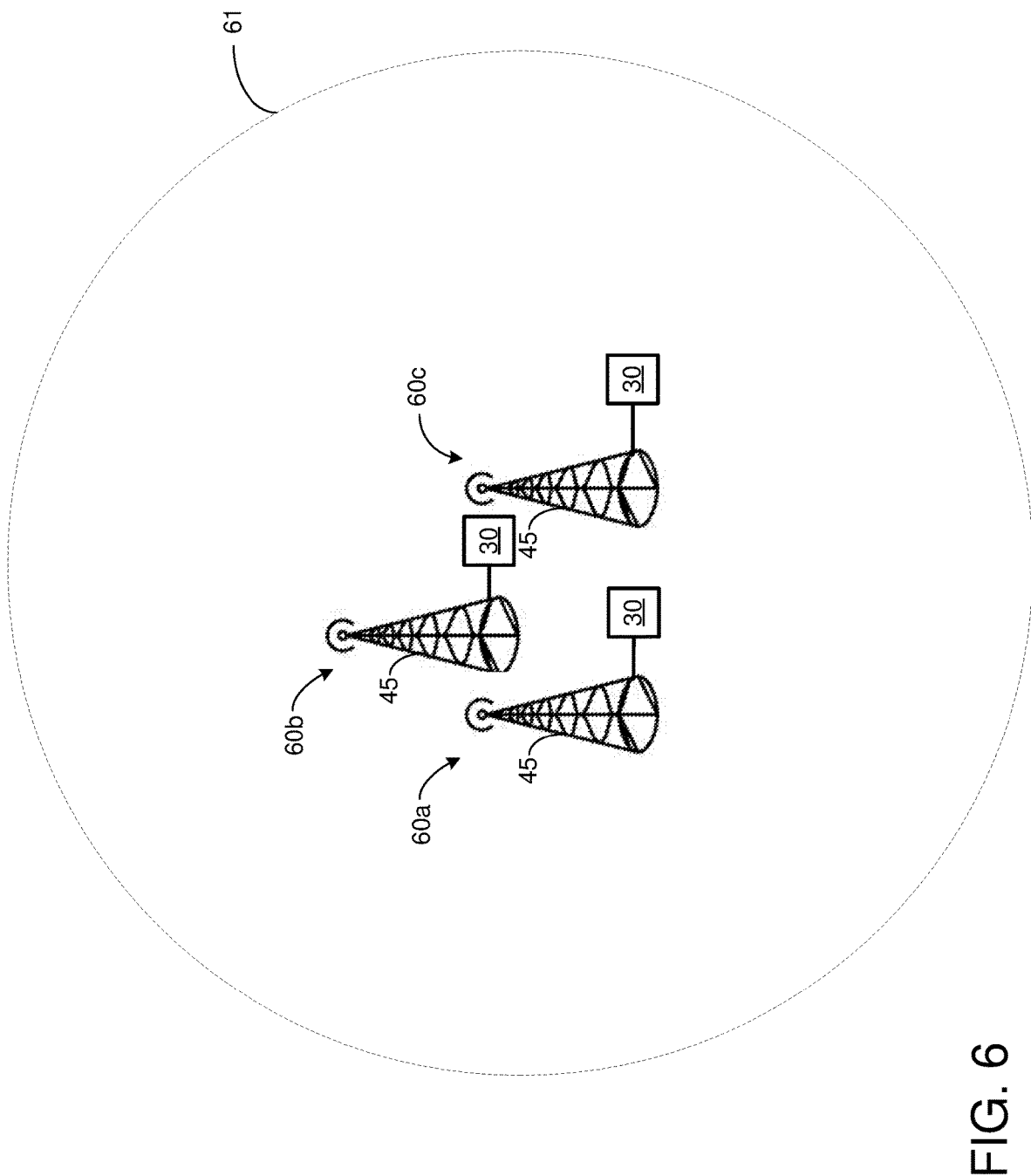
FIG. 6 is an illustrative diagram of three cell sites of three different wireless providers that are all communicating with an instance of the system 30 or 60 shown in FIG. 2 or 3.

Preferably, the wireless first responder transit alert signal is broadcast to all of the wireless provider networks and received by at least all of the wireless provider cell sites of zones in which the PCD that broadcasted the alert signal is traveling, e.g., AT&T, Sprint and Verizon cell sites, for example. FIG. 6 is an illustrative diagram of three wireless provider cell sites 60a, 60b and 60c of three different wireless providers that are all communicating over the same cell zone area 61. As indicated above, preferably at least one instance of the system 30 of the present disclosure is implemented in each of the wireless providers' networks that are participating in the first responder transit alert system and methodology of the present disclosure. Thus, all of the wireless networks of providers implementing the inventive principles and concepts of the present disclosure will include the system 30 that receives the GPS coordinates of the PCD of the first responder vehicle 10. In addition, those wireless providers' networks that have cell sites (represented in FIG. 6 by numerals 60a-60c) that are in communication with the PCDs of vehicles 2-4 and with the PCD of the first responder vehicle 10 will receive the GPS coordinates of the PCDs of vehicles 2-4.

Consequently, each instance of the system 30 that detects that a wireless first responder alert signal has been broadcasted, or that is notified by some network element that a wireless first responder alert signal has been detected, will receive the GPS coordinates of the PCD of the first responder vehicle 10 and of the PCDs of any other vehicles 2-4 that are communicating over the respective wireless provider network. Each instance of the system 30 involved in the process will then calculate the velocities of the PCDs of the vehicles 2-4 and 10.

After calculating the velocities of the PCDs of vehicles 2-4 and 10, the positions and velocities of the PCDs 2-4 and 10 are processed to identify the PCDs that are traveling in the vehicles 3 that are in the forward path of the first responder vehicle 10 a configurable threshold distance from the first responder vehicle 10, as indicated by block 153. After identifying the PCDs that are traveling in the vehicles 3 that are in the forward path of the first responder vehicle 10 a configurable threshold distance from the first responder vehicle 10, a wireless first alert transit notification is sent to the PCDs identified as traveling in the vehicles 3 that are in the forward path of the first responder vehicle 10 a configurable threshold distance from the first responder vehicle 10, as indicated by block 154.

The computer code comprising the first responder transit alert method can be stored in any suitable memory device, such as memory 120 shown in FIG. 4. It is understood that there may be other applications that are stored in the memory 120 and are executable by the processor(s) 100. Where any component discussed herein is implemented in the form of software, any one of a number of programming languages may be employed. The term "executable," as that term is used herein, means a program file that is in a form that can ultimately be run by a suitable processor, such as the processor(s) 100 shown in FIG. 4. Examples of executable programs may be, for example, a compiled program that can be translated into machine code in a format that can be loaded into a random access portion of the memory 120 and run by the processor(s) 100, source code that may be expressed in proper format such as object code that is capable of being loaded into a random access portion of the memory 120 and executed by the processor 100, or source code that may be interpreted by another executable program to generate instructions in a random access portion of the memory 120 to be executed by the processor(s) 100, etc. An executable program may be stored in any portion or component of the memory 120 including, for example, random access memory (RAM), read-only memory (ROM), hard drive, solid-state drive (SSD), USB flash drive, memory card, optical disc such as compact disc (CD) or digital versatile disc (DVD), floppy disk, magnetic tape, or other memory components.

The memory 120 or whichever memory is used to implement the method of the present disclosure can be any suitable non-transitory computer-readable medium, including both volatile and nonvolatile memory. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In various embodiments, the processors and controllers described herein can be embodied as a collection of discrete, integrated, or a mixture of discrete and integrated analog, digital, or mixed analog and digital hardware circuit components. For example, the RICs 50 and 60 and processor(s) 100 can be embodied as collections of discrete analog, digital, or mixed analog and digital hardware circuit components. The hardware can include one or more discrete logic circuits, microprocessors, microcontrollers, or DSPs, application specific integrated circuits (ASICs), programmable logic devices (e.g., field-programmable gate array (FPGAs), or complex programmable logic devices (CPLDs)), among other types of processing circuitry.

Figure 7:
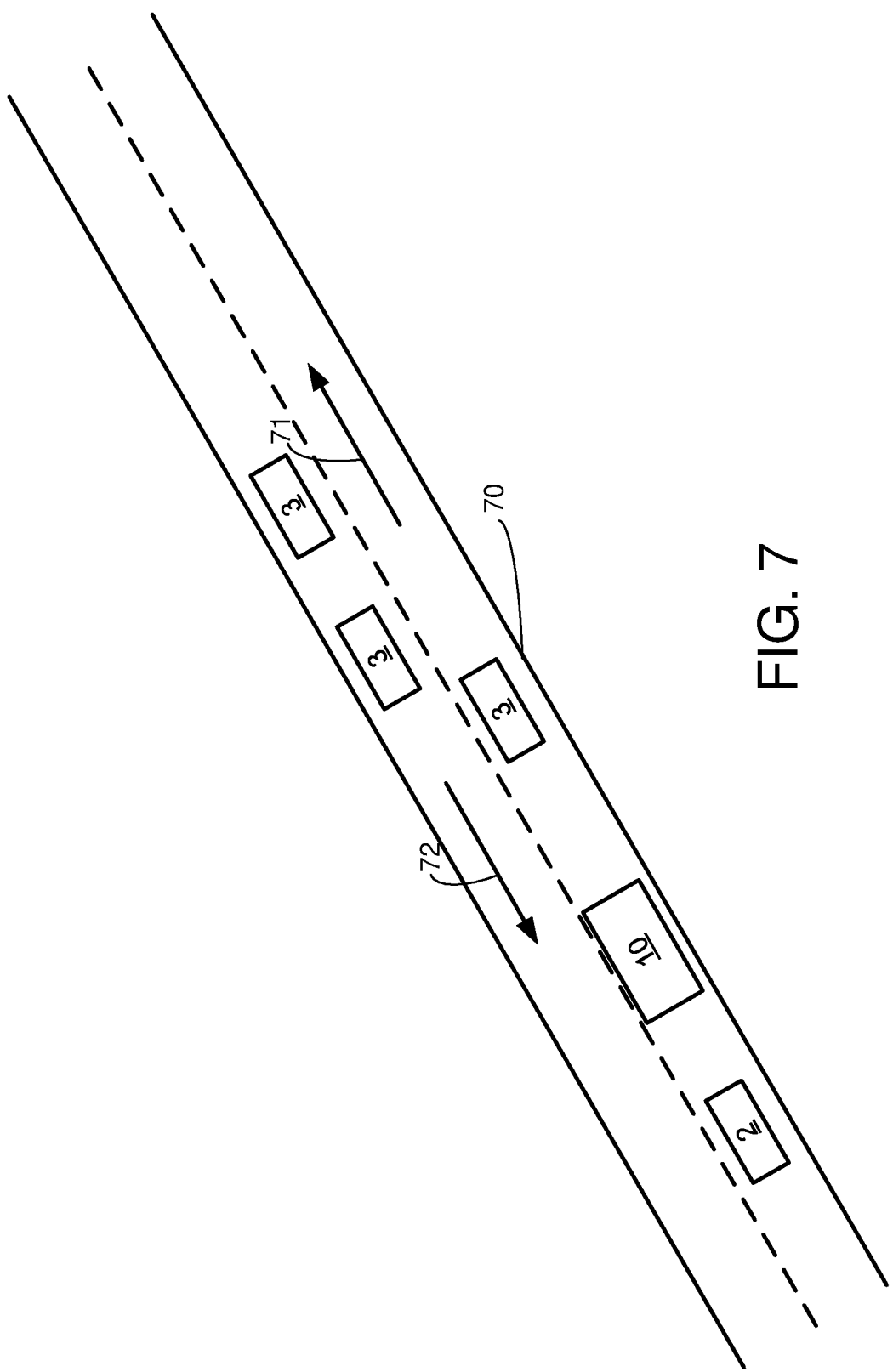
FIG. 7 is a diagram of a two-lane highway having two adjacent lanes for traffic moving in opposite directions.

It should be noted that while the representative embodiments described above only cause the alert notification to be sent to the PCDs of the vehicles 3 that are in the forward path of the first responder vehicle 10 a configurable threshold distance ahead of the first responder vehicle 10, the system and method could be configured to also send the alert notification to the PCDs of vehicles that are traveling toward the first responder vehicle 10. For example, in cases where the first responder vehicle 10 is traveling on a two-lane highway having two adjacent lanes for traffic moving in first and second directions that are opposite one another, the alert notification should be sent to the PCDs of vehicles that are traveling in both directions and that are a configurable threshold distance in front of the first responder vehicle 10. FIG. 7 is a diagram of a two-lane highway having two adjacent lanes for traffic moving in first and second directions indicated by arrows 71 and 72, respectively. In this case, it is desirable for the alert indication to be sent to the PCD of the vehicle 3 traveling in the first direction 71 a configurable threshold distance in front of the first responder vehicle 10 and to the PCDs traveling in vehicles 3 in the opposite direction 72 toward the first responder vehicle 10 a configurable threshold distance in front of the first responder vehicle 10. However, it is unnecessary to have the alert sent to the PCD traveling in vehicle 2 behind the first responder vehicle 10. By using the GPS coordinates of the PCDs traveling in the vehicles 3 to determine their positions and velocities, the system and method described above with reference to FIGS. 1-6 can be used to cause the alert indication to be sent only to the PCDs of vehicles 3.

Figure 8:
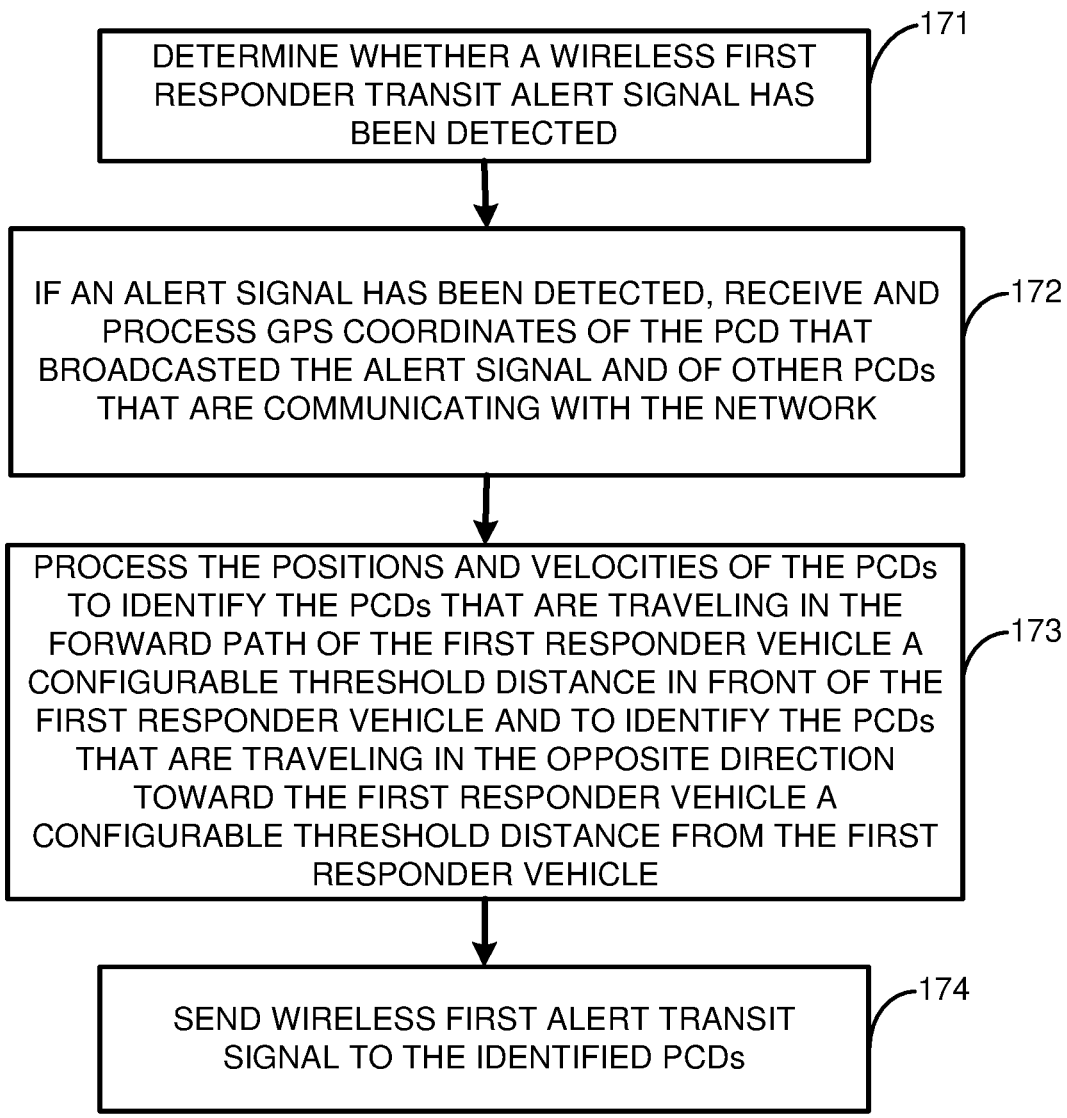
FIG. 8 is a flow diagram of the first alert transit alert method of the present disclosure performed by the system of the present disclosure in accordance with a representative embodiment in which the alert indication is sent to the PCDs of the vehicles traveling in both lanes.

FIG. 8 is a flow diagram of the first alert transit alert method of the present disclosure performed by the system of the present disclosure in accordance with a representative embodiment in which the alert indication is sent to the PCDs of the vehicles 3 traveling in the first direction 71 a configurable threshold distance in front of the first responder vehicle 10 and to the PCDs traveling in vehicles 3 in the opposite direction 72 toward the first responder vehicle 10 a configurable threshold distance in front of the first responder vehicle 10. Steps 171, 172 and 174 are identical to steps 151, 152 and 154, respectively, shown in FIG. 5 and described above. Therefore, steps 171, 172 and 174 will not be described herein.

After calculating the velocities of the PCDs of vehicles 2-4 and 10 at block 172, the positions and velocities of the PCDs 2-4 and 10 are processed to identify the PCDs that are traveling in the vehicles 3 that are in the forward path of the first responder vehicle 10 a configurable threshold distance from the first responder vehicle 10 and PCDs of vehicles traveling in the opposite direction toward the first responder vehicle 10 a configurable threshold distance in front of the first responder vehicle 10, as indicated by block 173. After identifying those PCDs, a wireless first alert transit notification is sent to the identified PCDs, as indicated by block 174.

The system 30, 60 can have multiple modes that can be selected by the first responder to cause the system 30, 60 to only send the alert indication to the vehicles 3 shown in FIG. 1 that are traveling in the same direction as the first responder vehicle 10 or to be sent to the vehicles 3 shown in FIG. 7 that are traveling in both directions. The mode can be automatically selected when the transit route for the emergency is chosen and loaded into the PCD or CAD of the first responder vehicle 10.

It should be noted that the "DETERMINE" steps 151 and 171 in FIGS. 5 and 7, respectively, can mean actual detection of the alert signal that is broadcast by the PCD of the first responder vehicle as well as receiving an indication from another element of the network that an alert signal broadcast by the PCD of the first responder vehicle has been detected. As indicated above, an element of wireless network can perform actual detection of the alert signal and then notify the system 30 that the alert signal has been detected and identify the PCD that broadcasted the alert signal.

Many other variations can be made to the system and method as well to ensure that the alert notification is sent to the PCDs of the appropriate vehicles. It should also be noted that as the first responder vehicle 10 travels from one cell tower zone into another, the alert notification that is broadcasted can be handed off to the cell tower zone that the vehicle 10 is entering or about to enter. When this happens, the system 30, 60 associated with the new cell tower zone will typically perform the method described above with reference to FIG. 5. Some of the data that is needed to perform the method can be transferred from one instance of the system 30, 60 to another instance of the system 30, 60 so that the system 30, 60 of the new cell tower zone does not necessarily have to acquire or generate this data each and every time a handoff occurs. Similarly, when the PCD of the first responder vehicle 10 broadcasts the wireless alert signal, the network 20 can cause the alert signal to be sent to each relevant systems 30, 60 of the network 20. The term "relevant systems" as used in the proceeding sentence means systems 30, 60 that would likely be involved in causing the alert notification to be sent out to PCDs traveling along the same route as the first responder vehicle. For example, systems 30, 60 involved in causing the alert notification to be sent out to PCDs in California would likely not be involved in causing the alert notification to be sent out to PCDs in New York. It should be noted, however, that the inventive principles and concepts are not limited with regard to where instances of the system 30, 60 are physically located.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Many variations to the disclosed embodiments can be made within the scope of the present disclosure and all such variations are within the scope of the invention and the appended claims, as will be understood by those skilled in the art from a study of the drawings, the disclosure, and the appended claims.

What is claimed is:

1. A first responder alert system for sending wireless alerts to personal computing devices (PCDs) communicating over a wireless network, the system comprising:
   wireless network equipment comprising:
     a memory device; and
     a processor in communication with the memory device, the processor being configured to perform a first responder transit alert process comprising steps of:
       determining whether a wireless first responder transit alert signal has been broadcast by a wireless device of a first responder vehicle to indicate that the first responder vehicle is in transit to a site of an emergency;
       in response to a determination that a wireless first responder transit alert signal has been broadcasted, processing geographical coordinates of multiple positions of each of a plurality of PCDs traveling in vehicles in one or more lanes of a highway system and of multiple positions of the wireless device of the first responder vehicle to determine velocities of the PCDs and of the wireless device of the first responder vehicle, wherein the geographical coordinates are computed by the wireless network equipment and sent to the processor of the wireless network for use in calculating the velocities of the PCDs and of the wireless device of the first responder vehicle;
       determining a subset of the PCDs to which to send a wireless alert notification based on the positions and velocities of the PCDs and of the wireless device of the first responder vehicle; and
       causing the wireless alert notification to be sent to the PCDs of the subset to inform users of the PCDs of the subset to take evasive action to clear a path for the first responder vehicle, the subset of PCDs being limited to PCDs that are in vehicles that are a configurable threshold distance in front of the first responder vehicle.

2. The first responder alert system of claim 1, wherein the subset of PCDs is further limited to PCDs that are in vehicles traveling in a first direction in said one or more lanes in a forward path of the first responder vehicle said configurable threshold distance in front of the first responder vehicle.

3. The first responder alert system of claim 2, wherein the highway system comprises a plurality of lanes for vehicular traffic traveling in a first direction and a plurality of lanes for vehicular traffic traveling in a second direction that is generally opposite the first direction, and wherein the subset of PCDs is further limited to PCDs that are in vehicles traveling in the first direction, and wherein the first responder vehicle is also traveling in the first direction.

4. The first responder alert system of claim 1, wherein said one or more lanes comprises at least a first lane for vehicular traffic traveling in a first direction and at least a second lane for vehicular traffic traveling in a second direction that is generally opposite the first direction, and wherein the first responder vehicle is traveling in the first direction in the first lane, and wherein the subset of PCDs comprises PCDs that are in vehicles traveling in the first direction in the first lane said configurable threshold distance in front of the first responder vehicle and PCDs that are traveling in the second direction in the second lane said configurable threshold distance in front of the first responder vehicle.

5. The first responder alert system of claim 1, wherein the wireless network comprises an Open Radio Access Network (O-RAN), and wherein the processor comprises a Radio Access Network (RAN) Intelligent Controller (RIC) of the O-RAN network.

6. The first responder alert system of claim 5, wherein the RIC is a near-real-time (near-RT) RIC of the O-RAN network, and wherein the first responder transit alert process comprises one or more computer application programs (XApps) that are stored in the memory device and executed by the near-RT RIC.

7. The first responder alert system of claim 5, wherein the RIC is a non-real-time (non-RT) RIC of the O-RAN network, and wherein the first responder transit alert process comprises one or more computer application programs (RApps) that are stored in the memory device and executed by the non-RT RIC.

8. The first responder alert system of claim 5, wherein said determining whether a wireless first responder transit alert signal has been broadcast by a wireless device of a first responder vehicle comprises determining whether a New Radio (NR) Next Generation Node Base (gNB) of the O-RAN network has detected transmission of the wireless first responder transit alert signal over an air interface of the O-RAN network.

9. The first responder alert system of claim 5, wherein said determining whether a wireless first responder transit alert signal has been broadcast by a wireless device of a first responder vehicle comprises determining whether the processor has received an indication from a network element of the O-RAN network that the network element has detected transmission of the wireless first responder transit alert signal over an air interface of the O-RAN network.

10. A method for sending wireless alerts to personal computing devices (PCDs) communicating over a wireless network, the method being performed by wireless network equipment of the wireless network, the method comprising:
computing geographical coordinates of multiple positions of each of a plurality of PCDs traveling in vehicles in one or more lanes of a highway system and geographical coordinates of multiple positions of a wireless device of a first responder vehicle traveling in one or more cell site zones of the wireless network;
determining whether a wireless first responder transit alert signal has been broadcast by the wireless device of the first responder vehicle to indicate that the first responder vehicle is in transit to a site of an emergency;
based on a determination that a wireless first responder transit alert signal has been broadcasted, processing the geographical coordinates of multiple positions of each of a plurality of PCDs traveling in vehicles in one or more lanes of a highway system and the geographical coordinates of multiple positions of the wireless device of the first responder vehicle to determine velocities of the PCDs and of the wireless device of the first responder vehicle;
determining a subset of the PCDs to which to send a wireless alert notification based on the positions and velocities of the PCDs and of the wireless device of the first responder vehicle; and
causing the wireless alert notification to be sent to the PCDs of the subset to inform users of the PCDs of the subset to take evasive action to clear a path for the first responder vehicle, the subset of PCDs being limited to PCDs that are in vehicles that are a configurable threshold distance in front of the first responder vehicle.

11. The method of claim 10, wherein the subset of PCDs is further limited to PCDs that are in vehicles traveling in a first direction in said one or more lanes in a forward path of the first responder vehicle said configurable threshold distance in front of the first responder vehicle.

12. The method of claim 11, wherein the highway system comprises a plurality of lanes for vehicular traffic traveling in a first direction and a plurality of lanes for vehicular traffic traveling in a second direction that is generally opposite the first direction, and wherein the subset of PCDs is further limited to PCDs that are in vehicles traveling in the first direction and wherein the first responder vehicle is also traveling in the first direction.

13. The method of claim 10, wherein said one or more lanes comprises at least a first lane for vehicular traffic traveling in a first direction and at least a second lane for vehicular traffic traveling in a second direction that is generally opposite the first direction, and wherein the first responder vehicle is traveling in the first direction in the first lane, and wherein the subset of PCDs comprises PCDs that are in vehicles traveling in the first direction in the first lane said configurable threshold distance in front of the first responder vehicle and PCDs that are traveling in the second direction in the second lane said configurable threshold distance in front of the first responder vehicle.

14. The method of claim 10, wherein the wireless network comprises an Open Radio Access Network (O-RAN), and wherein the wireless network equipment comprises at least a first Radio Access Network (RAN) Intelligent Controller (RIC) of the O-RAN network.

15. The method of claim 14, wherein the RIC is a near-real-time (near-RT) RIC of the O-RAN network, and wherein the method is implemented by one or more computer application programs (XApps) that are stored in a memory device of the near-RT RIC and executed by the near-RT RIC.

16. The method of claim 14, wherein the RIC is a non-real-time (non-RT) RIC of the O-RAN network, and wherein the method is implemented in one or more computer application programs (RApps) that are stored in a memory device of the non-RT RIC and executed by the non-RT RIC.

17. The method of claim 14, wherein said determining whether a wireless first responder transit alert signal has been broadcast by a wireless device of a first responder vehicle comprises determining whether a New Radio (NR) Next Generation Node Base (gNB) of the O-RAN network has detected transmission of the wireless first responder transit alert signal over an air interface of the O-RAN network.

18. The method of claim 14, wherein said determining whether a wireless first responder transit alert signal has been broadcast by a wireless device of a first responder vehicle comprises determining whether the RIC has received an indication from a network element of the O-RAN network that the network element has detected transmission of the wireless first responder transit alert signal over an air interface of the O-RAN network.

19. A computer program comprising computer instructions embedded in a non-transitory computer-readable medium for sending wireless alerts to personal computing devices (PCDs) communicating over a wireless network, the computer program being executed by one or more processors of wireless network equipment of the wireless network, the computer program comprising:

- a first code segment that computes geographical coordinates of multiple positions of each of a plurality of PCDs traveling in vehicles in one or more lanes of a highway system and geographical coordinates of multiple positions of a wireless device of a first responder vehicle traveling in one or more cell site zones of the wireless network;
- a second code portion that determines whether a wireless first responder transit alert signal has been broadcast by the wireless device of the first responder vehicle to indicate that the first responder vehicle is in transit to a site of an emergency;
- a third code portion, wherein if the second code portion determines that a wireless first responder transit alert signal has been broadcasted, the third code portion processes the geographical coordinates of multiple positions of each of the plurality of PCDs and the geographical coordinates of multiple positions of the wireless device of the first responder vehicle to determine velocities of the PCDs and of the wireless device of the first responder vehicle;
- a fourth code portion that processes the positions and velocities of the PCDs and of the wireless device of the first responder vehicle to determine a subset of the PCDs to which to send a wireless alert notification; and
- a fifth code portion that causes the wireless alert notification to be sent to the PCDs of the subset to inform users of the PCDs of the subset to take evasive action to clear a path for the first responder vehicle, the subset of PCDs being limited to PCDs that are in vehicles that are a configurable threshold distance in front of the first responder vehicle.

\* \* \* \* \*